Jan. 20, 1970  O. H. HALLSTROM  3,490,813
CONVEYANCE OF MATERIAL REQUIRING HYGIENIC DISPOSAL
Filed July 26, 1967  7 Sheets-Sheet 4

Inventor
Olof Henrik Hallstrom
By Cushman, Darby & Cushman
Attorneys

Jan. 20, 1970  O. H. HALLSTROM  3,490,813
CONVEYANCE OF MATERIAL REQUIRING HYGIENIC DISPOSAL
Filed July 26, 1967  7 Sheets-Sheet 7

Inventor
Olof Henrik Hallstrom
By Cushman, Darby & Cushman
Attorneys 3,490,813
CONVEYANCE OF MATERIAL REQUIRING
HYGIENIC DISPOSAL
Olof Henrik Hallstrom, Stockholm, Sweden, assignor to
A/B Centralsug, Stockholm, Sweden
Filed July 26, 1967, Ser. No. 656,118
Claims priority, application Great Britain, July 29, 1966,
34,146/66
Int. Cl. B65g 53/06
U.S. Cl. 302—17                          11 Claims

ABSTRACT OF THE DISCLOSURE

This invention relates to means and method for collecting, transporting, and delivering such materials as garbage, or soiled linen, in relation to which for hygiene and aesthetic reasons, special measures should preferably be taken. The invention is practiced by the provision of chutes which are opened by specialised valves into a suction duct, weherin the material is conveyed to a separator in which the material is arrested for further treatment.

SUMMARY OF INVENTION

Material to be handled within the province of the invention may be of very varied character, from wet mixtures of packings, waste food or vegetable matter, household debris and dust, to soiled linen in bags, which may be highly unsterile from the hygienic point of view. The invention provides various forms of special valve upon which the material stacks in a gravity chute; the valve is adapted to open quickly and to be self-clearing of material, and gives access for the material to drop or be carried by air entrainment into a suction duct. The duct leads the material, usually a very considerable distance and at high speed, into a collector chamber in which it is arrested, and special coarse and fine filtering is provided; the suction is created by a battery of air pumps, with means to cut out any one at a time. According to the nature of the material, means are provided for moving material from the chamber periodically, during which operation the air flow may be diverted bypassing the chamber.

The invention relates to means and method for the conveyance and in some cases partial treatment of garbage, or of other material such as soiled linen requiring hygienic disposal either by destruction (as by incineration), planned dumping (as in waste-filling of an area) or to a location for further treatment such as washing and sorting (as for hospital or institutional laundry).

The invention seeks to provide means in the form of an installation or system, and a method involving at least one critical step which ensures that the movement of the material is initiated in such a positive and sudden way that, even if it be a material which is reluctant to move in a conduit such as mixed wet garbage, it keeps on the move and can be delivered for treatment. It is also ensured that in the case of garbage (which is usually a random mixture including paper, used containers, bits of cloth, waste foodstuffs, bones, vegetable matter, etc.) the material except for its lighter ingredients such as paper, is not subjected to a filtering process which would be extremely difficult to arrange, but is merely deposited in a collecting chamber where it can be temporarily held for discharge and disposal at convenient intervals. And they further ensure that material which may be offensive or unhygienic, does not become fixed or lodged in the system and that any flow of air which might be polluted by the material, is an inward flow into the system, which is discharged at a remote location and which may if required be induced into a furnace in which the causes of smells, or microbes carried by the air, are destroyed.

One typical application of the invention resides in an installation, for example for blocks of apartments, the purpose of which is the collection and subsequent conveyance of domestic garbage to a disposal point at which it is preferably incinerated, but may be merely bulked for further conveying for example by garbage truck. This application involves certain practical requirements, such as the inhibition of escaping smells, the certainty that the garbage will reach its required destination in a prescribed short time, and that despite the great variety of types of material which go to make up domestic garbage, it is all efficiently handled, be it loose dry paper or empty cans or bottles. It is also desirable to provide for controlled incineration of garbage (when incineration is used) either by continuous or batch burning, in either case the feed to the incinerator requiring control. Other practical requirements arise, such as precautions against a stoppage due to obstruction.

In hygienic conveyance of material such as hospital laundry, similar but not identical requirements exist. For example, though there might be a smell problem, it is even more important to provide against the distribution of bacteria etc. by polluted air. Such laundry is bagged before conveyance, so the problem is the conveyance of batches of fairly specific size. Delivery is not immediately to any such treatment-plant as an incinerator but rather is for sorting, sterilising, and laundering or for transport to those ends.

The invention provides means and method to achieve the requirements thus briefly outlined. In addition, it may be so applied as to provide a "vacuum cleaner" service in a building (known per se) having an array of plug-in points for flexible hose and tools, and a suction system to convey the collected duct and small debris.

According to the invention, apparatus for collecting and conveying for disposal solid material such as garbage or other waste solid material, or soiled linen, comprises an upright chute with door access by which material is put into the chute so as to fall therein by gravity; a conveying suction duct running from the bottom of the chute into a chamber; means for separating conveyed material from air sucked through the duct comprising the chamber through which such air passes being such that the velocity of the air therein is so reduced that the material is deposited in the chamber; a valve between the bottom of the chute and the duct which valve is normally closed against entry of air into the duct and is adapted then to receive and retain material fallen thereonto in the chute; and means for sucking air from the chamber and therefore along the duct to convey material from the chute to the chamber. It is also provided that when the material is released into the duct by the opening of the valve, it (the material) is simultaneously entrained in a high-velocity stream of air which thereafter continues to convey it at high velocity until it arrives in the chamber.

According further to the invention it is provided in apparatus having the foregoing feature, that the said valve is so designed as to be self-cleaning when it is opening; that is to say that material which may be stuck to the valve or tend to stick to it, is mechanically dislodged so that it falls through the valve. Having regard to the nature of household garbage and the actual weight of material which may rest on the valve, which tends to consolidate and stick the material on the valve, this provision is highly significant.

According to the invention, apparatus for collecting and material and conveying it for disposal resides in dropping the material from a valve upon which it has been gravitationally supported into a duct, simultaneously entraining the material in a high-velocity air stream created by sucking air through the duct through a chamber, bringing the material to rest in the chamber, and subsequently removing the material from the chamber at atmospheric pressure.

The apparatus includes a number of features of invention which are subordinate to the general inventive concept, and of which details will be described below by reference to examples. These include various pneumatic arrangements, for example certain valved bypass conduits; chute door arrangements; separation chamber arrangements; and arrangement of parallel linen-disposal and garbage-disposal systems; special duct-filter arrangements and other details which have been contrived to contribute to the efficiency of the system which is the main inventive feature. It also includes the provision of a plurality of conveying ducts in parallel which converge so as all to lead to a common chamber and are therefore served by common sucking means.

The invention applies directly to garbage disposal and to a similar installation with modifications later described, for use for linen disposal purposes: and another addition is proposed, in which the same apparatus is adapted for point-operated vacuum cleaning, such in itself being previously known.

It may here be mentioned that the extractor or pumping unit preferably consists of several centrifugal blowers the inlets of which are connected in parallel, each through a closable cut-off valve; there being more blowers than necessary to operate the system so that in case of failure or to enable the blowers to be serviced one by one, at least one blower can be out of action and is then pneumatically isolated.

The common duct for air to the extractor unit is manifolded from a plurality of fine filter units for dust. These follow (in series in the air flow) a main separator which comprises a separator chamber of preferably vertical cylindrical shape into the wall of which is led the conveyor duct. In the lower part is disposed one or preferably several mechanical conveyors (each appropriately powered) at the delivery end of which is a hermetically closable door or hatch. These deliver to the incinerator (if such be used) or bulking-press, or other destination for the garbage.

In the upper part of the separator unit is a screen across the vessel which acts as a coarse filter for loose paper or such like substances in the garbage which might be carried along with the air. There may be provided a valved bypass between the inlet and outlet of the sparator, and a relatively small filter therein; this is brought into use when collected material is to be discharged, i.e. whilst a worm is running, because it is at that stage necessary to relieve the vacuum in the separator chamber.

Next in series in the air flow from the main separator chamber and the extractor unit, is a plurality of filters in parallel. Each of these comprises a vessel with an inlet near the bottom and outlet from near the top. Between these across the filter vessel is a filter assembly which is resiliently mounted (for example its edge is attached to the vessel wall through a flexible margin of rubber or impervious fabric) which is suspended by springs, and which carries a vibrator motor. This filter assembly has through it several large holes, and attached at the margin of each hole is a depending bag-filter of textile fabric kept distended by an internal coil-spring or a perforated hollow core. The bottom of each filter vessel is formed as a hopper and this is closed by a dust-valve: there may be provision of washing down the hopper with water.

The volume of the separator chamber is such that the air flow though it is decelerated; this results in the material being brought to rest, or so decelerated that it simply falls down towards the lower part of the chamber. Even so, lighter parts of the material such as paper, may tend to be carried along with the air, and because of this the chamber is provided with a coarse filter, through which the air is sucked upwards. Thus, light material is arrested on the downward side of the coarse filter. It is removed from the coarse filter by (a) falling off when the flow of air is stopped; (b) by being detached from the coarse filter by some mechanical means, resembling a windscreen wiper in concept; (c) by the air flow through the chamber being reversed, in that conduit and valve means are provided such that, on demand, air from the pumps is blown down through the chamber to clear the coarse filter and this may also tend to blow down the material in the chamber on to the discharging conveyors at the bottom of the chamber.

When "suction" is not applied—that is when the extractor unit is idle, the main bulk of the garbage with paper fallen off the screen, is discharged by the mechanical conveyors, and finer dust and light particles are discharged from the filters by opening the dust valves.

The duct itself, which may be of very considerable length, say half a mile, is a large diameter steel pipe, which may have bends both laterally and vertically, and appropriate provision for thermal changes of length. In practice, no part of it should incline upwards (i.e. in the flow direction) more than about 30°. If it be required to form a sharp rise in the duct, for example to reach up to the top of the separator chamber, it is formed as a helix with a pitch of less than 30°. At locations at which there is a risk of blockage there may be provided upstream thereof, a bypass inlet valve to allow a local inflow of air to scavenge the blocked or suspected blocked section of duct.

The duct leads from one or a plurality of locations, for example wings or sections of an apartment block. It is assumed that there is a vertical garbage chute at each location, each apartment, or perhaps each floor, having at least one garbage door. In one example, each such chute, at its bottom end, has an elastic cuff (e.g. of rubber). At this location the duct has a frusto-conical mouth immediately below the chute and of larger diameter than the cuff. A disc valve is seated (e.g. on a nylon seat forming the margin of the mouth) so as normally to prevent ingress of air into the duct and, lying across the cuff, forming a floor upon which garbage within the chute rests by gravity ready for conveyance. This valve is pivoted on an axis outside the perimeter of the mouth and through a lever is actuated by a suitable quick-acting servomotor or power actuator. This is preferably a pneumatic or hydraulic jack; if pneumatic it may be suction-operated by connection to the duct and/or to a suction reservoir connected to the duct, and it may be spring operated in one sense of direction. Such a valve is self-cleaning, because its upper surface is wiped by the rubber cuff as the valve opens.

When this valve is opened as it is very quickly, it admits atmospheric air through the annular gap between the duct-mouth and the cuff, and air from the chute which is sucked in by the "injector" effect and the garbage, previously upheld by the valve (and the cuff), is sucked with violent acceleration, into the duct, entrained in the high-velocity air stream induced through the annular gap. The actuation of this valve involves operation of position-sensitive switches and there is also a time-switch arrangement, all so connected as to cause operation of the actuator. This arrangement is such that the valve having been opened stays open for a predetermined time, long enough to ensure that the corresponding batch of garbage is well on its way down the duct if not actually in the separator.

Moreover the switches of the valves are so interconnected that the valves open in sequence, and no two are open simultaneously.

In a duct of about 24″ diameter, the extractor unit is such as to produce a depression of about 0.25 atmosphere when all valves are closed, and an air velocity of about 60–70 ft./sec. when a valve is fully open. The velocity of the air at the mouth at the moment of valve opening, though not actually measured is known to be of very high order—probably near Mach 1—so that the effect on the accumulated garbage dropped by the valve is virtually implosive. Reverting to the discharge from the separator, each worm may be capable of being isolated so that it can discharge individually without "breaking" the vacuum above it. Moreover, instead of worm conveyance from the separator, there may be chain conveyors, or airlock-type delivery valves, or as will be shown below, a ram-type conveyor. Means may be provided to shift material downwards to the conveyors should it tend to hold itself up, by the incident known as "arching."

The foregoing relates of course to garbage disposal.

The following describes a system having some of the same features, but modified for the conveyance to a central point, of hospital laundry done up in bags of such size as to fit, very approximately, in the bore of the duct.

In this case the duct leads through a depositing chamber (which may be emptied either when the airflow is stopped or through an airlock) to the extractor unit and there is no separator or filter as such. At the intake locations, individual chutes have valves similar to those above described, or these are replaced by pairs of valves constituting air locks. Each chute has laundry depositing hatches, at each floor level, and these are arranged to be substantially hermetically sealed when closed. At the top of each chute there is a loaded inlet valve for the ingress of atmospheric air, and the bottom valve (or valves) is bypassed by a relatively small duct, so that the chute is subject to reduced internal pressure and air in the chute, possibly contaminated infectively, never escapes into the building. The loaded valve opens, however, to admit atmospheric air to the chute when the main disposal valve at the bottom, is opened. Thus, one or more bags of laundry awaiting conveyance, are subject to the full available pressure-difference when the bottom valve is opened to drop them. To obviate the question of static electrical charges, or frictional heat, a duct for laundry may be provided with water injectors at locations down its length.

In either or both of the foregoing examples of systems or installations, the conveying duct may lead from a multiplicity of "suction points" in a building (of a kind known in themselves), to any one of which a vacuum-cleaner hose and appropriate tools, may be connected, there being a valve at each point. Dust etc. thus collected, is disposed of for example by the filter previously described.

In the case for example of a hospital or like institution it may be required to dispose both of garbage and of linen; the invention affords a duct system, using a common source of suction, and this will be described by way of example.

Various practical expedients may add to the working efficiency of the system. For example, the air expelled by the suction plant or at least some of it, may be used for the forced draught of an incinerator furnace coupled to the system. Thus, for example, one of the battery of suction blowers, may be arranged to run after the main conveying suction has stopped, with the dual purpose of maintaining a slightly negative pressure in the duct so as to obviate the escape of polluted air, and to force draught to the associated incinerator. Another useful possibility is, to provide valving and ducting such that the air flow through the separating chamber can be reversed (that is, be from top to bottom) so as to clear the coarse filter in the chamber of paper etc. and to tend to urge the collection of garbage down on to the discharging conveyors of the chamber. Then of course the conveyor closing-valves are opened, and a separate air conduit system is used to lead blower output to the top of the chamber.

There may be various precautionary or emergency provisions.

For example if a main chute valve fails to close due to some construction, a signal-light indicates the facts, for the attention of the supervisor. Likewise insufficient or failed vacuum may be indicated.

Where the distance to be travelled is very long the duct flow may be boosted at stations along its route. For example a first run, up to (say) a mile, may be as described above; this delivers into a second run, or to some other form of conveyor.

All the garbage from a dense-population area may be conveyed several miles, for ultimate disposal at a suitable dumping-ground or into barges or lighters for dumping at sea.

The accompanying diagrammatic drawings illustrate the invention as applied to garbage disposal, and to laundry conveying.

Figure 1:
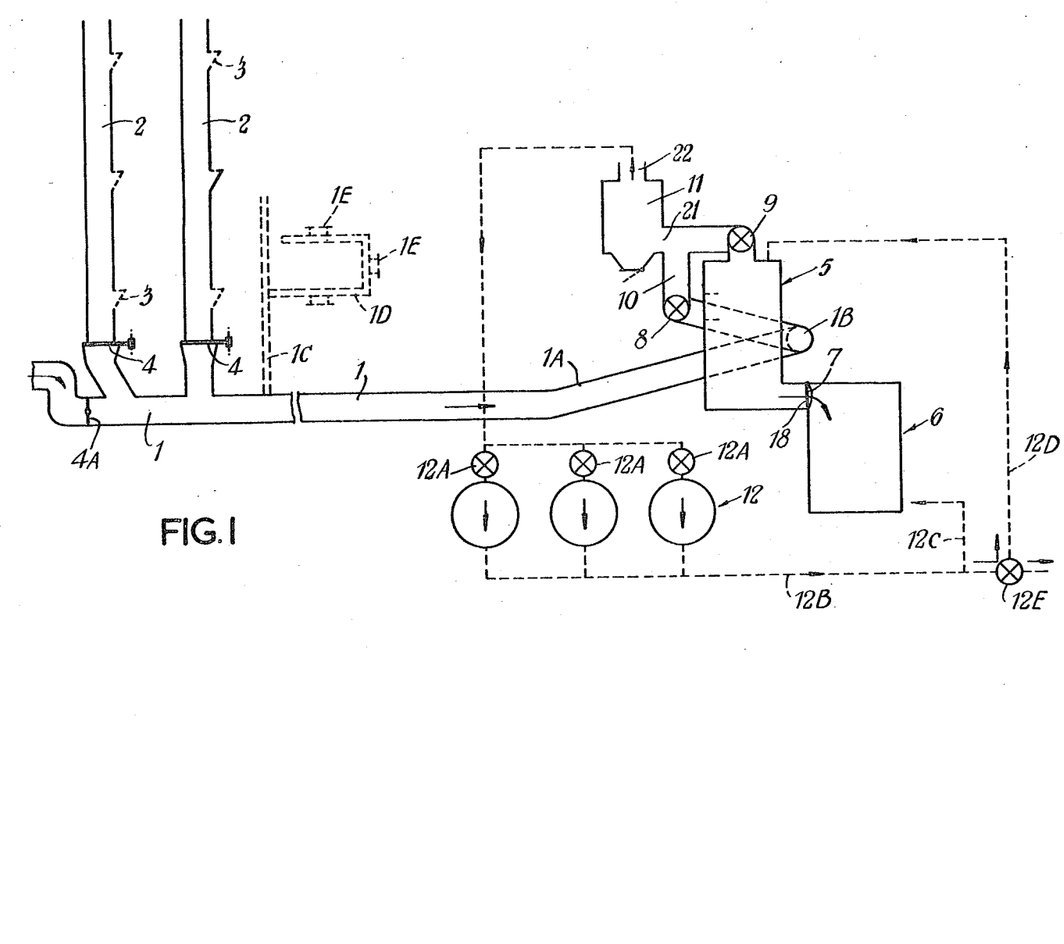
FIGURE 1 is a schematic illustration in elevation of an installation for two adjacent blocks of apartments, for domestic garbage.

In FIGURE 1 there is a main conveyor duct 1, into which lead two upright garbage chutes 2 which have garbage doors at 3, on floors of each tier of the building. At the bottom of each chute 2 is a valve 4, described below in relation to FIGURES 6, 7 or 8.

The duct 1 leads, up a slope at 1A (if required) not exceeding 30°, into a separator chamber 5, described later in relation to FIGURE 4. The angle of slope may be kept below the limit of about 30° by employing a helical path, as indicated at 1B. Garbage is conveyed into the chamber 5, in which it comes to rest (the air flow being decelerated) and falls on to one or preferably several parallel worm conveyors 16 (FIGURE 4), so arranged as to discharge the garbage periodically into an incinerator 6, through a vacuum-sustaining valve at 7 which is opened on such occasions. To enable the discharge of the chamber (when valve 7 is opened) valves 8 and 9 are operated to bring into action a bypass duct 10 which bypasses the air flow from the duct 1 directly to a fine filter unit 11, which is in practice a battery of filters in parallel.

Normally, however, the flow is from 1 into 5 and thence to 11. From the fine filter (an example of which will be described in relation to FIGURE 5) the air is sucked by the extractor pump unit which comprises a bank of centrifugal pumps in parallel, indicated at 12, and mainly exhausting to atmosphere. Each pump preferably has its own inlet-closing valve 12A, so that any one can be out of action whilst the others continue to suck. The common outlet 12B of the pump unit 12 may have a branch 12C, by which air at positive pressure is lead into the furnace of the incenerator 6 to provide forced draught; this can conveniently and economically be achieved for example by running only one of the pumps 12, closing the valves 12A of the others, and the secondary advantage is then given that the whole system is slightly vacuumised even though not being operational: thus any escape of polluted air can be avoided. There may also be a compressed-air branch 12D controlled by a valve 12E, by which the pump output may be used to blow down the chamber 5 (valves 8 and 9 being closed) in order to clear the coarse filter in the chamber and, if it be arched or jammed, to urge material down on to the discharging conveyor 16.

Figure 4:
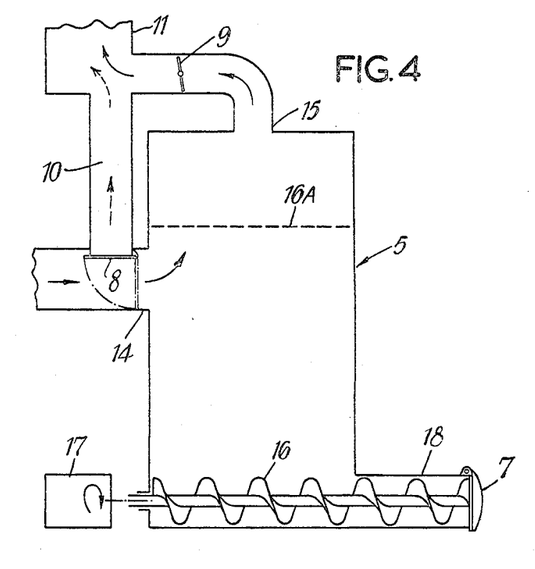
FIGURE 4 diagrammatically illustrates in side elevation, the arrangement of a garbage separating chamber.

In FIGURE 4 is illustrated the separator chamber 5. This comprises a large preferably cylindrical pressure-tight vessel with an air-and-garbage inlet at 14 and an air outlet at 15. Across the interior is a coarse filter screen 16A to catch and hold down paper and suchlike "fly" material included in the garbage.

At the bottom of the vessel or silo is a series of parallel worm discharging conveyors 16 each driven by an external motor 17, by an appropriately glanded shaft. Each worm delivers garbage through an outlet 18 which is normally closed by a vacuum-sustaining valve 7.

Outside the separator chamber 16 a bypass duct 10, and in it is a valve 8; a like valve 9 is placed in the outlet duct from 15. The valve 8 which is purely diagrammatically indicated, is a two-way valve, normally closing the bypass duct 10 but, on occasion, opening 10 and closing 14. Thus, the vacuum in the chamber 5 is relieved when required, so that the accumulation of garbage in the chamber 16 can be discharged. The air flow, temporarily, is direct to the fine or dust filter unit 11.

Figure 5:
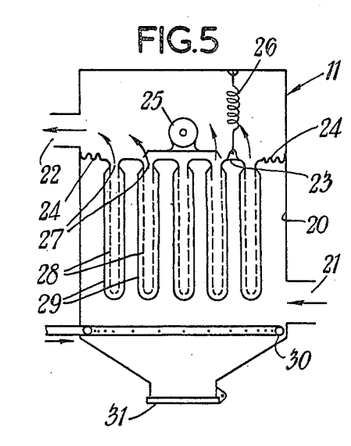
FIGURE 5 similarly illustrates one of a battery of dust filters.

Each filter of the unit 11 (there are preferably several in parallel and each may have its own cut-off valves for "blowdown" or emptying) is as shown in FIGURE 5.

A pressure-tight vessel 20 has low inlet 21 and high outlet 22. Across the interior between these, is a diaphragm 23 of sheet metal, attached to the vessel's wall by a flexible ring 24 for example of rubber. On the diaphragm is a vibrator motor unit 25 and the diaphragm is suspended by one or more springs 26.

In the diaphragm 23 is a series of slit-like apertures 27, each defining the top edge of a flat sheet-metal chamber with walls 28, the walls 28 being freely perforated and being totally clothed in filter-cloth 29, through which air (direction indicated by the arrows) passes inwards depositing dust on the cloth 29. The bottom of the filter vessel 20 is hopper-shaped and around its upper margin there is preferably provided a perforated water pipe 30, to enable dust accumulated in the vessel to be washed out. At the very bottom is an airtight emptying valve or door 31 by which the arrested dust is discharged periodically.

The valves 4 of the system shown in FIGURE 1 are of considerable importance in the operation of the system; they must sustain the weight of the material accumulated in their chute, and whilst doing so they must be airtight to sustain the vacuum below them; and whilst opening quickly enough to ensure the material being entrained in a high-velocity air stream they must also be self-cleaning to ensure that all material resting upon them is dropped into the duct. Valves suitable for these requirements are shown in FIGURES 6, 7, 7A and 8.

Figure 6:
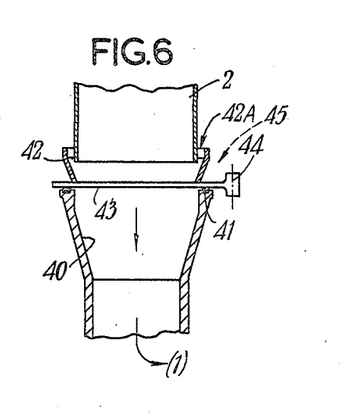
FIGURE 6 illustrates one form of quick-opening self-cleaning valve for use in a system such as FIGURES 1, 2 or 3.

In FIGURE 6, provided at each feed location of a chute 2 into the duct 1, there is a funnel-like mouth 40 which opens divergently upwards. The rim of the mouth has a nylon or other sealing insert valve seat at 41. The bottom end of the chute 2 has an elastic cuff 42, for example of rubber. The margin of the cuff 42 lies roughly in or just above the same plane as the seat 41. The valve itself is a flat disc or plate 43 which when closed, fully closes the mouth 40 and seats on 41. The valve 43 is robustly pivotally mounted at 44 and, though not illustrated, there is a powerful hydraulic jack or actuator connected to a lever-like extension of the valve. This actuator is such that it will open the valve completely, in a very rapid movement. As it opens the valve admits atmospheric air to duct 1 through the annular gap at 45, drops garbage which it hitherto supported, and of course, permits air to flow down chute 2. The arrangement of the mouth in relation to the chute affords an injector effect, and because of the relatively large vacuumised volume of the duct 1 and end capacities, there is initiated by opening the valve a surge of air which rapidly and almost implosively entrains the garbage, which thereafter is carried along the duct at a velocity which corresponds to (though somewhat less than) the 60–70 ft./sec. or so which is maintained in duct 1 by the extractor unit. The cuff 42 is made to that it bears down on the upper surface of the valve plate 43 with sufficient force to ensure that that surface is scrubbed clean of material which may be stuck to it so that the valve is self-cleaning. Moreover, the cuff preferably is so formed that it has same perforation at 42A, of relatively small total area. The function of this is to allow air to enter into the chute 2 when the valve is closed, to ventilate the chute. To aid this, the chute 2 may have at its top end and air extractor fan. The current of air so provided keeps the chute purged of smelly air.

It is also to be noted in all the representative figures that the lowest end of the chute 2 leading into the duct 1 is slightly inclined: this is a purely practical design feature, introduced because the chute usually comes down close to a wall, and the duct is usually somewhat spaced away from that alignment. The indication is provided merely to accommodate the installation to the architecture.

It can also be noted from FIGURE 1, that provision is made for a centralised suction-cleaning system in the building, of a nature already known in itself. To provide this, there is a branch connection 1C to the duct 1 which leads from localities represented by sub-branch 1D, each having connection points 1E for suction-cleaning appliances. Each sub-branch 1E may correspond, for example, to the arrangements in one dwelling apartment.

Figures 2, 8:
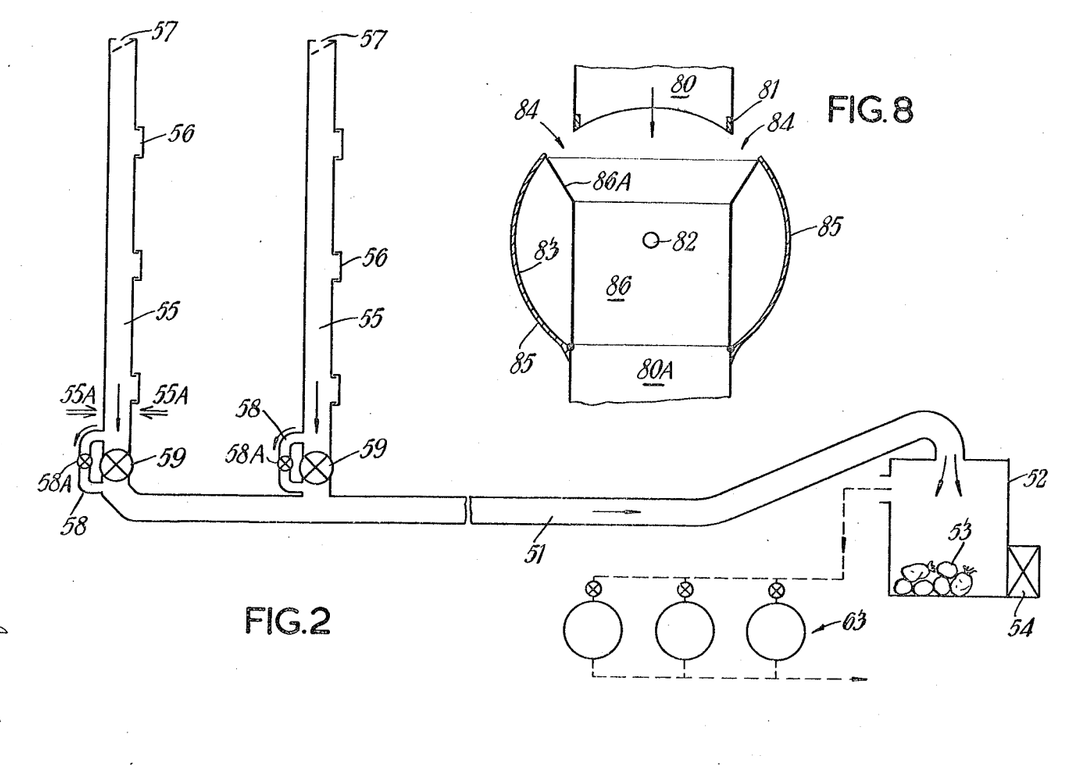
FIGURE 2 similarly illustrates a system for the disposal of soiled linen in bags, for a hospital.
FIGURE 8 illustrates a third form of self-cleaning valve.

Turning to FIGURE 2, an installation of somewhat similar nature is illustrated, for hospital laundry. In this, the main conveyor duct 51 leads into a collector chamber 52, which is normally pressure-tight. From chamber 52 air is sucked by the extractor pumping unit 63 which is essentially the same as that of FIGURE 1. Into the chamber 52 are delivered bags of soiled linen etc. (a collection of which is indicated at 53) and access to these for further handling is by an airlock at 54 (if access be required without breaking the vacuum) or by using a door after breaking the vacuum.

The duct 51 leads from linen chutes 55 each serving a block or tier of floors. At each floor is a linen chute access door 56, and in this case, the doors are hermetically sealed and may have automatic interlocks (as is known in the art) so that two in a chute cannot be open simultaneously: preferably also the valve 5.

The chutes 55 are normally closed at the top by fairly lightly-loaded inwardly-opening valves, indicated at 57. Their loading is such that they sustain some degree of vacuum in the chutes, and this is provided for by restricted bypass ducts 58, valved at 58A, bypassing the main laundry valve 59 of each chute. The object is, that the chutes are always under reduced pressure so that any leakage is always inwards, for hygienic reasons.

Laundry, admitted into the chute through the doors 56 in bags, is retained by the valve 59 until it is to be conveyed. The valve 59 is then opened and the surge of pressure-difference thus caused in the chute, causes the valve 57 to open; thus, the bag or bags is rapidly accelerated into the duct 51, by the full available pressure-difference (say, 0.25 atm.). Interlocks may be provided so that the valve 59 can only open when all the doors 56 are shut.

In this connection, there is preferably provided an "electronic eye" control to ensure full operation of the system. At a location indicated by the double arrows at 55A, below the lowermost door 56, is arranged a photoelectric cell and light source so that if the light beam across the chute 55 is interrupted more than momentarily by the accumulation of bags of linen on the valve 59, the valve 59 is opened.

In some cases, the bypass 58 is arranged to pass a considerable flow of air from a location in the chute 55 above the expected level of linen; and a second bypass of much less passage area may be provided across the valve 58A, to maintain the slight suction in the chute which is above referred to.

Figure 3:
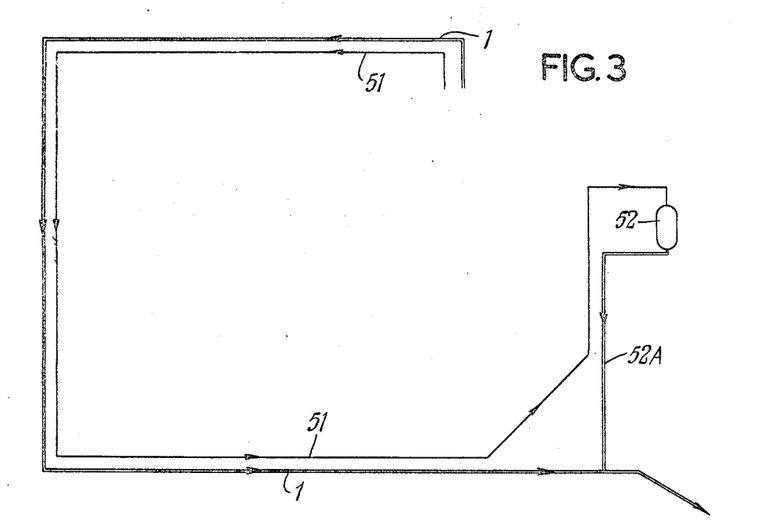
FIGURE 3 illustrates, by way of a plan schematic diagram, how a garbage system and a linen system can be combined, as for a hospital installation.

In FIGURE 3, it is shown in plan how the garbage system of FIGURE 1 and the linen system of FIGURE 2, can be combined. The respective mains ducts 1 and 51 are shown running in parallel and each is assumed to have its appropriate chutes, not shown. The garbage duct 1 runs direct to a garbage separator chamber (not shown) as in FIGURE 1. The linen duct 51 leads into the linen separator chamber 52, wherein the bags of linen come to rest, and air passing therethrough flows by connector 52A to joint the duct 1. Thus, both services are operated from a common suction pump unit. In such an installation, which is primarily intended for hospitals or like institutions with almost continuous demands for service, the pump unit will run continuously; thus the linen chutes especially, can be kept at sub-atmospheric pressure to avoid positively, escape of polluted air.

The linen conveying ducts may be provided with means to inject water at one or more localities in their lengths, to avoid electrostatic charging by friction and perhaps also to act as a lubricant to prevent excessive heating or abrasion of the linen bags.

Figures 7, 7A:
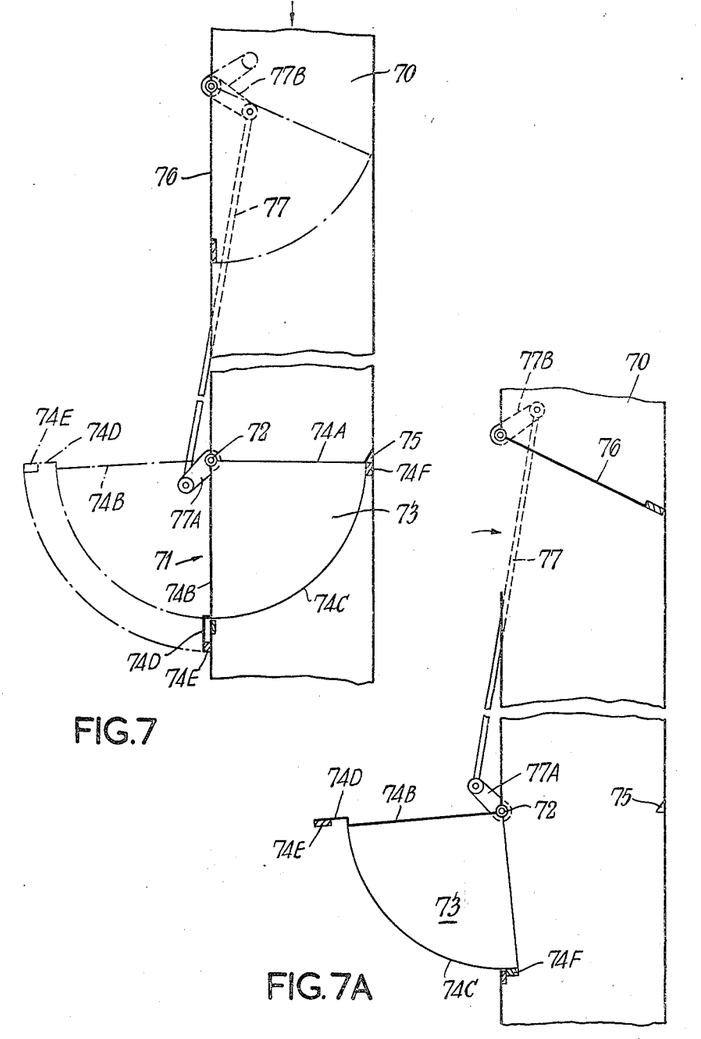
FIGURE 7 illustrates diagrammatically a second form of self-cleaning valve.
FIGURE 7A illustrates the valve of FIGURE 7 when open.

FIGURES 7 and 7A show, as alternative to the valve of FIGURE 6, a valve which can be fast-opening and self-cleaning in a different way, and which is balanced so far as pressure-differential is concerned. It is to be remarked that the dimensions of chute which are under consideration are considerable—say in the order 400 square inches, and that the pressure-difference across a valve 4 is in the order 4 lbs./sq. in. Therefore the actual load downwards, on the valve even when unloaded of material, is very considerable, say 1,600 lbs. Balancing such a pressure may be of considerable advantage.

In FIGURES 7 and 7A, the circular section of the chute 2 (or 55) is at its lower end merged into a rectangular section at 70 and it continues rectangular until it joins the duct 1 (or 51). In a wall of this section is a rectangular opening, at 71. At the upper margin of the opening, at 72 is hinged a valve element 73; this is a geometrically solid quarter-segment of a cylinder, having flat radial faces 74A, 74B, flat end faces, and peripheral arcuate surface 74C. In the chute section 70 is a downwardly-facing valve seating 75, against which the margin of the face 74A bears when the valve is closed. The face 74A is preferably extended to provide an overlap part 74D which makes the area of 74B larger than that of the opening 71. The part 74D is provided with a rubber seal 74E, to bear against the outside of the chute. Thus, when the valve is closed as in FIGURE 7, the suction below it acting on the full area of 74B plus 74D, more than balances the downward suction acting on 74A. Thus, not only is the valve balanced as to pressure difference, but at least part of the weight of the material it is to support, is balanced by the suction. The valve can then be opened quickly, and during opening, the "solid" volume of it virtually occupies the opening 71, thus preventing much inflow of air. The margin of the surface 74A can be provided with a lip 74F which, when the valve rapidly opens, impacts the wall of the chute: it may be provided with a rubber buffer, so that it rebounds a little on impact, and thus dislodges any material which tends to stick to the face 74A. Thus the valve is both quick-opening and self-cleaning. It is operated by any suitable power actuator (not shown) such as a hydraulic jack. By a simple elaboration, the opening of the valve can automatically operate an air admission valve in the chute, above the expected level of accumulated material. Such a valve is indicated at 76, hinged to the chute wall at 76A. It is operated through a link 77 which interconnects a crank 77A attached to the main valve, and 77B attached to valve 76, all so that opening of the main valve also opens the air valve 76.

FIGURE 8 represents, in its open position, a third variant of valve having the required properties. In this valve, which for ease of manufacture is preferably installed in a chute of rectangular section, the upper part 80 of the chute is provided with a rubber seal 81, and with its axis across the chute, at 82, is a cylindrical valve element. Below the seal 81 is a gap at 84 to admit air, but otherwise the valve 83 is shrouded in an arcuate protection wall 85, which joins the lower part 80A of the chute. Across the valve element 83 is a passage 86 of about the same cross section as the chute 80, except that at one end this passage is flared at 86A. The valve element is power operated by any suitable means, to move quickly through 90°, so that from the closed position as drawn, the passage 86 aligns with the chute 80, 80A, and the flare at 86A registers with the gap 84 to admit air. The valve element 83 may rest on antifriction rollers at 87 which support the valve, the pressure-load on it, and the weight of the material on it. This valve is self-cleaning, because the seal 81 scrubs it as it opens. The valve of FIGURE 8 may be interconnected, like the valve of FIGURE 7, with an air valve higher up the chute.

In the valves of both FIGURES 7 and 8, the actual valve element can be fabricated of sheet-metal and thus be of reasonably light weight despite the big load it has to resist.

Turning now to the further FIGURES 9 to 14, these illustrate different ways of providing for the admission of air in such a way as to ensure that a charge of material from any chute or duct, is entrained in the required high-velocity air stream. There are basically two approaches to the problem. In the first place, there must be free flow of air into the chute above or with the material, and in the second place, there should be available a free flow of air directly into the duct, at a point further upstream than the most upstream chute. One way of providing for this latter requirement is shown in FIGURE 1, by the presence of direct air entry controlled by the valve 4A: this valve is intended to be opened immediately before any of the valves 4 is opened, so that there is already in the duct 1 a high-velocity stream of air when the material falls from a chute. Indeed this valve 4A can in some cases be left open at all times, but if so there will be no provision for keping the system continuously under slight vacuum, which is thought to be desirable.

Figure 9:
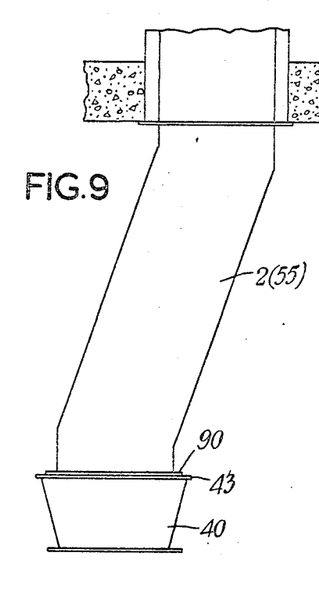
FIGURE 9 illustrates how the valve of FIGURE 6 may be combined with a second rather similar valve.
Figure 10:
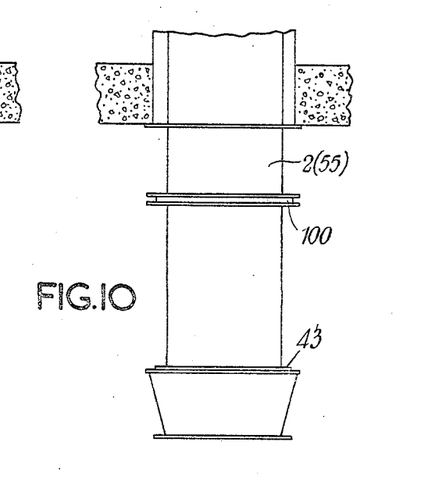
FIGURE 10 illustrates the use of two spaced valves like those of FIGURE 9.

In FIGURE 9 the chue 2 (or 55) is provided with two slide valves one on top of the other. The lower valve is a valve such as 43 of FIGURE 6; one which admits air into the lower part of the chute. Immediately above it is a second slide valve 90, having its own operating mechanism (not shown) and intended to close the bottom of the chute 2 after the accumulated material has been dropped, whilst leaving the air entry at 45 open because the lower valve 43 is still open. Thus, anything dropped down the chute whilst the previous batch of material is in the course of being transported, is held up. Obviously, the valves 43 and 90 will be operated on a sequential basis by any suitable control means.

In FIGURE 10 there are again two valves. The lower one 43 is as before. The upper one, 100, is spaced higher up in the chute 1 (55) so as to be above the highest expected level of material. Valve 100 is closed before valve 43 is opened or immediately thereafter.

Figure 11:
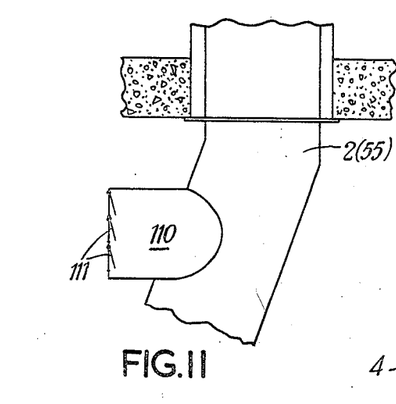
FIGURE 11 shows how a valved air inlet may be provided.

In FIGURE 11 the lower end of the chute, above the valve 4 is provided with an air inlet branch 110 which may lead from outside the building. To prevent escape of polluted air or of loose material, this branch 110 is provided with non-return inlet valves in the form of hinged flaps 111. Whilst such a valve device may be automatic (and may be gravity or spring biassed towards closing) it may if required be interconnected with the main valve 4, much as is provided in FIGURE 7.

Figure 12:
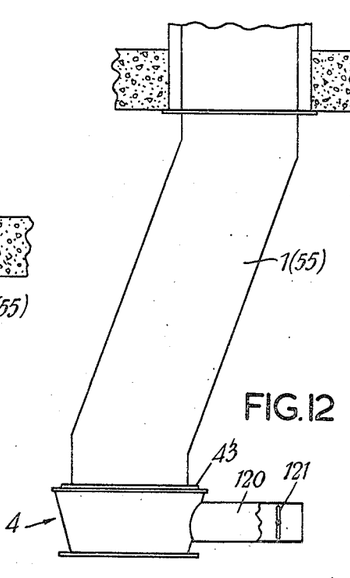
FIGURE 12 shows another valved air inlet.

FIGURE 12 shows a somewhat similar branch inlet 120 but in this case it is below the valve 4; it has a valve 121 which is operated by actuator, and is opened either with the main valve 4 (43) or as the latter closes, to admit material-conveying air at high velocity.

Figure 13:
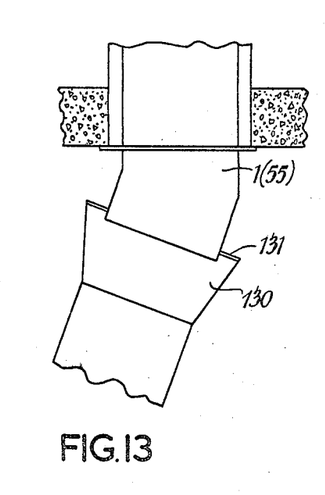
FIGURE 13 shows an unvalved air inlet in a chute.

FIGURE 13 offers a simple air admission: in the chute 1 (55) and spaced well above the main valve (not shown) is a flared section 130 converging downwards, into which extends the length of chute above it. This leaves an annular air gap at 131, so that air can always freely enter the chute, and can entrain the material as soon as suction is applied by the opening of the main valve. This device may be used with the reverse extractor device mentioned in connection with FIGURE 4 to keep the chute purged of polluted air.

Figure 14:
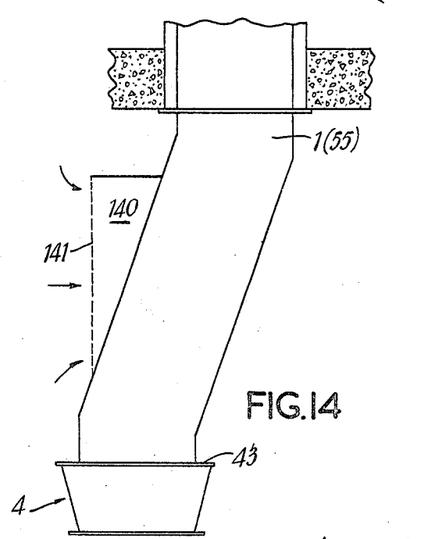
FIGURE 14 shows an alternative form of air inlet in a chute.

FIGURE 14 indicates the lower part of the chute 1 (55) above the valve 4, supplied with a lateral box-like enlargement 140 which has a flat external wall at 141 which is made of perforated metal or of gauze to admit air freely whilst enclosing the material.

Figure 15:
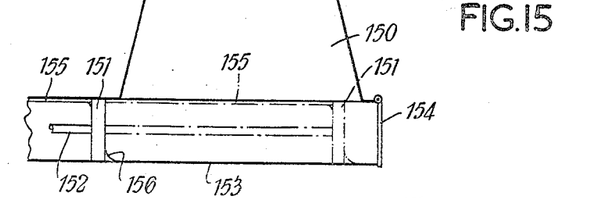
FIGURE 15 illustrates schematically in elevation, a chamber discharging conveyor alternative to that of FIGURE 4.
Figures 15A, 16:
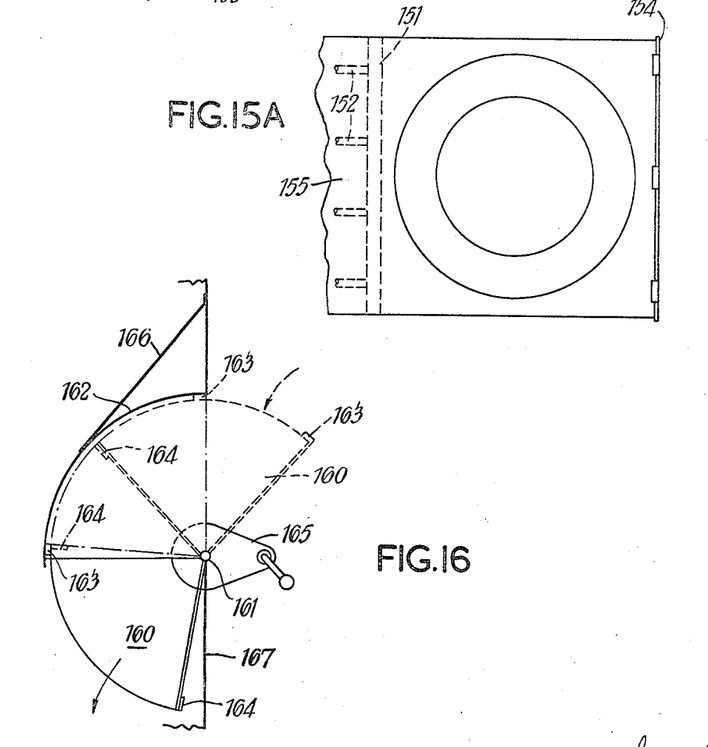
FIGURE 15A is a plan view corresponding to FIGURE 15.
FIGURE 16 illustrates a chute door adapted for use in the system.

Turning back to FIGURE 4 and the problems of the separating chamber and referring to FIGURES 15 and 15A, there is shown an alternative to the worm discharge conveyors 16. This device may be used not only to discharge the chamber but to consolidate the material if that be required in order to make it more compact, for example if it is discharged into some other form of transport.

The lower part of the chamber, shown as 150, is made somewhat divergent downwards. Its bottom end is rectangular in plan (FIGURE 15A shows the change from circular to rectangular section). Across the bottom flow 153 is slidable a ram 151, reciprocated by hydraulic piston rods 152 powered by a suitable source. The ram 151 can move right across the floor of the chamber, to push to the discharge gate 154, all the material lying on the floor 153. The discharge gate 154 is an elongated rectangular gate or valve, such as to open for discharge, and to seal against air ingress when closed. The ram 151 has a drawer top at 155 which closes off the interior of the chamber whilst the ram is operative, and of course prevents material from falling behind the ram. The ram may have a scraper lip at 156 to ensure dislodging material from the floor 153.

There may also be provided within the separator chamber, any expedient means to disturb the material should it hold up or "arch." One such means, namely air pressure, has been mentioned in connection with FIGURE 1. Other means, such as chains scraping the walls, hydraulically rising and falling tines to engage the bulk of the material, or water washing down the walls, may be employed.

It may occur that a housewife uses an access door 3 (FIGURE 1) to dispose of garbage whilst the corresponding valve 4 is open; there may (according to the air inlet provision) be a substantial pressure difference tending to slam the door, so that there is a risk of injury or that something will jam the door open. FIGURE 16 indicates a precaution which may be taken against such an accident. In this, the door is constructed as a segmentally-shaped hopper 160, hinged at 161, and operating within an arcuate cowl 162 which projects inwards across part of the cross-section of the chute. The hopper 160 has a rubber seal edge 163 to contact the cowl 162 when closed, and a second brushing seal 164 to contact the cowl then the door is open; the hopper is of about 90° segmental shape, and the cowl subtends at least that angle. It is operated by hand, through gearing housed in a box shown at 165 which is such that operation is irreversible by the pressure difference. Thus, the user opens the door (to position of dotted line) by turning a handle, the hopper 160 swinging clockwise (in the figure): she then puts the garbage into the hopper, and closes it. At the half-closed position (chain line) the hopper seals the door-opening from the chute in all positions and the gearing prevents it from violently closing by reason of air pressure into the chute. When the hopper is fully inwards (full line) the material falls out of it down the chute. The whole door device may be built into the wall 167 of the chute, and to prevent material from doors higher up lodging on the cowl 162, there may be provided a sloping baffle outwards from the wall 167 at a sufficiently acute angle to prevent lodging.

I claim:

1. Apparatus for collecting and conveying for disposal of material such as garbage or other waste solid material, or soiled linen, comprising an upright chute with door access by which material is put into the chute so as to fall therein by gravity; a conveying suction duct running from the bottom of the chute into a chamber; means for separating conveyed material from air sucked through the duct comprising the chamber through which such air passes and is so reduced in velocity that this alone causes the material to be gravitationally deposited in the chamber; a valve between the bottom of the chute and the duct which valve is normally closed against entry of air into the duct and is adapted then to receive and retain material fallen thereonto in the chute; means for sucking air from said chamber and therefore along said duct to convey material from the chute to the chamber; and two vacuum conveyor ducts leading respectively from chutes for garbage and like material and for batched soiled linen, these ducts leading independently and respectively to a first material collecting chamber and a second material collecting chamber, the ducts and chambers being served by common means for sucking air to which, pneumatically speaking, they converge after running parallel.

2. Apparatus for collecting and conveying for disposal of material such as garbage or other waste solid material, or soiled linen, comprising an upright chute with door access by which material is put into the chute so as to fall therein by gravity; a conveying suction duct running from the bottom of the chute into a chamber; means for separating conveyed material from air sucked through the duct comprising the chamber through which such air passes and is so reduced in velocity that this alone causes the material to be gravitationally deposited in the chamber; a valve between the bottom of the chute and the duct which valve is normally closed against entry of air into the duct and is adapted then to receive and retain material fallen thereonto in the chute; means for sucking air from said chamber and therefore along said duct to convey material from the chute to the chamber; and wherein a duct runs either horizontally or downwards, or upwards at a slope not exceeding about 30° of angle, and in which when it is required to ascend through a height not naturally accommodating such angle the duct is arranged in a helical or serpentine manner so as to enable that limitation of angle to be observed.

3. Apparatus according to claim 2 in which a reception chamber for material is constituted by a structure of circular plan form, and the duct is led to the upper part thereof but below a filter therein, by winding around it.

4. Apparatus for collecting and conveying for disposal of material such as garbage or other waste solid material, or soiled linen, comprising an upright chute with door access by which material is put into the chute so as to fall therein by gravity; a conveying suction duct running from the bottom of the chute into a chamber; means for separating conveyed material from air sucked through the duct comprising the chamber through which such air passes and is so reduced in velocity that this alone causes the material to be gravitationally deposited in the chamber; a valve between the bottom of the chute and the duct which valve is normally closed against entry of air into the duct and is adapted then to receive and retain material fallen thereonto in the chute; means for sucking air from said chamber and therefore along said duct to convey material from the chute to the chamber; and means whereby the chute is maintained with a slight vacuum therein, said last-mentioned means including an inward air leak into the chute above its main valve, and means to extract air from above the valve of the chute.

5. Apparatus for collecting and conveying for disposal of material such as garbage or other waste solid material, or soiled linen, comprising an upright chute with door access by which material is put into the chute so as to fall therein by gravity; a conveying suction duct running from the bottom of the chute into a chamber; means for separating conveyed material from air sucked through the duct comprising the chamber through which such air passes and is so reduced in velocity that this alone causes the material to be gravitationally deposited in the chamber; a valve between the bottom of the chute and the duct which valve is normally closed against entry of air into the duct and is adapted then to receive and retain material fallen thereonto in the chute; means for sucking air from said chamber and therefore along said duct to convey material from the chute to the chamber; air-tight access doors into the chute; interlocking means to prevent opening of the main valve of the chute when such a door is open and to prevent more than one such door being open at a time; and means for maintaining vacuum in the chute when the main valve on the doors are closed.

6. Apparatus for collecting and conveying for disposable material such as garbage or other waste solid material, or soiled linen, comprising an upright chute with door access by which material is put into the chute so as to fall therein by gravity; a conveying suction duct running from the bottom of the chute into a chamber; means for separating conveyed material from air sucked through the duct comprising the chamber through which such air passes and is so reduced in velocity that this alone causes the material to be gravitationally deposited in the chamber; a valve between the bottom of the chute and the duct which valve is normally closed against entry of air into the duct and is adapted then to receive and retain material fallen thereonto in the chute; means for sucking air from said chamber and therefore along said duct to convey material from the chute to the chamber; an air inlet in the chute and at a substantial height above the valve, said air inlet being of sufficient size to permit sufficient air to pass without substantial resistance through the valve when opened to entrain the material released by the valve; and two valve elements closely juxtaposed one above the other, the lower one having a larger opening area than the upper one, the difference of area being open to atmosphere.

7. Apparatus for collecting and conveying for disposable material such as garbage or other waste solid material, or soiled linen, comprising an upright chute with door access by which material is put into the chute so as to fall therein by gravity; a conveying suction duct running from the bottom of the chute into a chamber; mean for separating conveyed material from air sucked through the duct comprising the chamber through which such air passes and is so reduced in velocity that this alone causes the material to be gravitationally deposited in the chamber; a valve between the bottom of the chute and the duct which valve is normally closed against entry of air into the duct and is adapted then to receive and retain material fallen thereonto in the chute; means for sucking air from said chamber and therefore along said duct to convey material from the chute to the chamber; an air inlet in the chute and at a substantial height above the valve, said air inlet being of sufficient size to permit sufficient air to pass without substantial resistance through the valve when opened to entrain the material released by the valve; and wherein the chute at such a height above the valve as to be above the expected level of material accumulated on the valve has an opening to atmosphere formed by a section of less cross-sectional area entering the section of far greater cross-sectional area.

8. Apparatus for collecting and conveying for disposable material such as garbage or other waste solid material, or soiled linen, comprising an upright chute with door access by which material is put into the chute so as to fall therein by gravity; a conveying suction duct running from the bottom of the chute into a chamber; means for separating conveyed material from air sucked through the duct comprising the chamber through which such air passes and is so reduced in velocity that this alone causes the material to be gravitationally deposited in the chamber; a valve between the bottom of the chute and the duct which valve is normally closed against entry of air into the duct and is adapted then to receive and retain material fallen thereonto in the chute; means for sucking air from said chamber and therefore along said duct to convey material from the chute to the chamber; an air inlet in the chute and at a substantial height above the valve, said air inlet being of sufficient size to permit sufficient air to pass without substantial resistance through the valve when opened to entrain the material released by the valve; and in which the air inlet into the chute is provided with a non-return valve to admit the air and to prevent exit of air.

9. Apparatus for collecting and conveying for disposable material such as garbage or other waste solid material, or soiled linen, comprising an upright chute with door access by which material is put into the chute so as to fall therein by gravity; a conveying suction duct running from the bottom of the chute into a chamber; means for separating conveyed material from air sucked through the duct comprising the chamber through which such air passes and is so reduced in velocity that this alone causes the material to be gravitationally deposited in the chamber; a valve between the bottom of the chute and the duct which valve is normally closed against entry of air into the duct and is adapted then to receive and retain material fallen thereonto in a chute; means for sucking air from said chamber and therefore along said duct to convey material from the chute to the chamber; and wherein the chute has a rectangular cross-section in which is its main valve, the latter having a correspondingly profiled material-supporting surface, and which is hinged so as to open downwards with sufficient violence to dislodge material from the surface.

10. Apparatus according to claim 9 in which the said valve is a substantially 90° segment of a cylinder, and swings through a rectangular opening in a wall of the chute, so that when moving the valve substantially blocks the opening against air flow, and when the valve is closed, the pressure differences acting upon it are balanced.

11. Apparatus for collecting and conveying for disposable material such as garbage or other waste solid material, or soiled linen, comprising an upright chute with door access by which material is put into the chute so as to fall therein by gravity; a conveying suction duct running from the bottom of the chute into a chamber; means for separating conveyed material from air sucked through the duct comprising the chamber through which such air passes and is so reduced in velocity that this alone causes the material to be gravitationally deposited in the chamber; a valve between the bottom of the chute and the duct which valve is normally closed against entry of air into the duct and is adapted then to receive and retain material fallen thereonto in the chute; means for sucking air from said chamber and therefore along said duct to convey material from the chute to the chamber; air tight access doors into the chute, and interlocking means to prevent opening of the main valve of the chute when such door is open and to prevent more than one such door being open at a time, and means for maintaining vacuum in the chute when the main valve and the doors are closed; wherein the said means for maintaining vacuum comprises a valved passage bypassing the main valve.

References Cited
UNITED STATES PATENTS

| | | | |
|---|---|---|---|
| 851,054 | 4/1907 | Bassler | 302—27 |
| 1,048,477 | 12/1912 | Allington | 302—27 |
| 1,112,151 | 9/1914 | Metten | 302—55 |
| 1,965,866 | 7/1934 | Tolman | 302—59 |
| 2,153,984 | 4/1939 | Leicht | 302—28 |
| 2,199,894 | 5/1940 | Phelps | 302—59 |
| 2,276,805 | 3/1942 | Tolman | 302—59 |
| 3,316,026 | 4/1967 | Hallstrom | 302—51 |

ANDRES H. NIELSEN, Primary Examiner

U.S. Cl. X.R.

302—27, 28